May 8, 1956 F. B. T. SIEMS 2,744,330
MARKING INSTRUMENT
Filed April 14, 1952 3 Sheets-Sheet 1
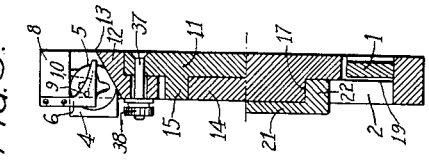
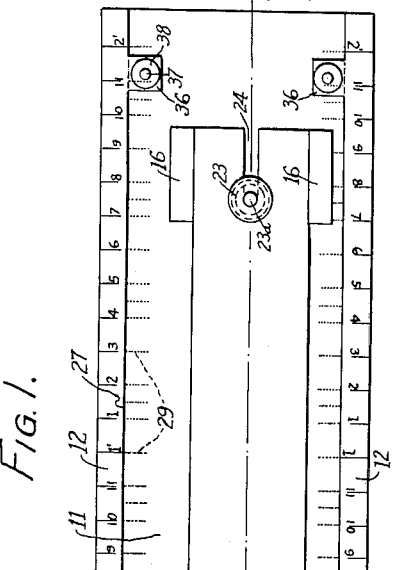
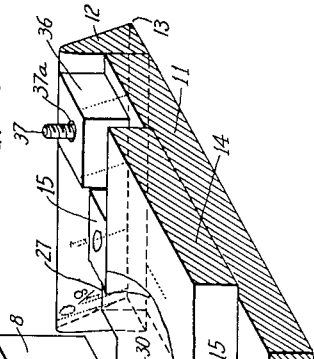
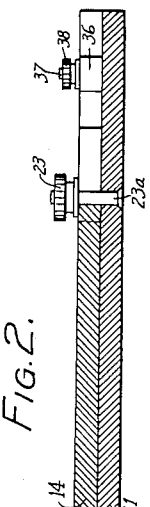
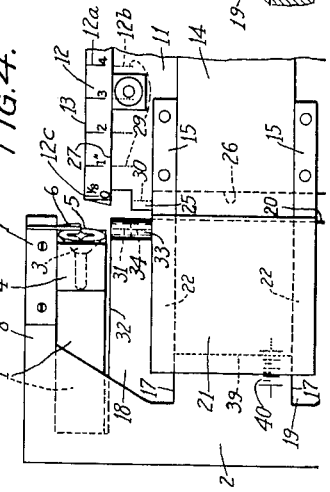
INVENTOR.
Frederick B. T. Siems,
BY
Leon Simon

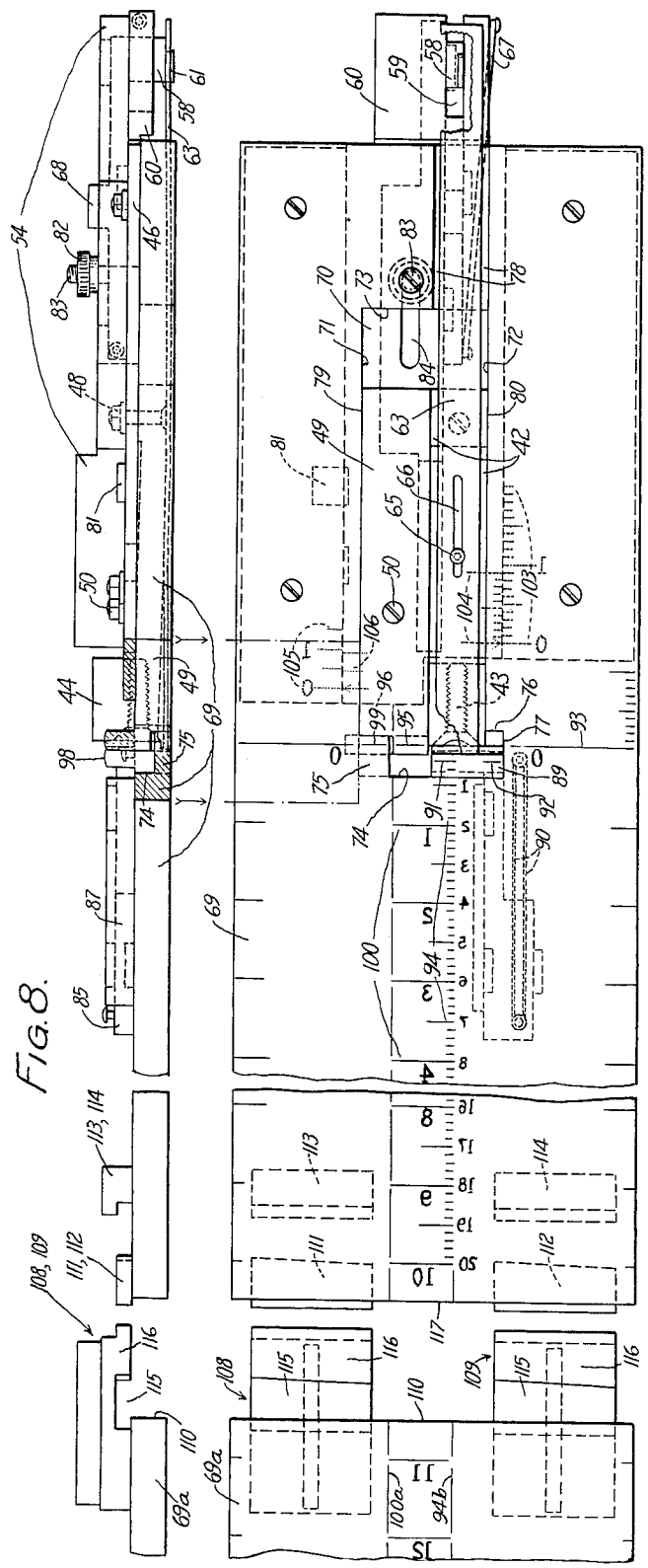

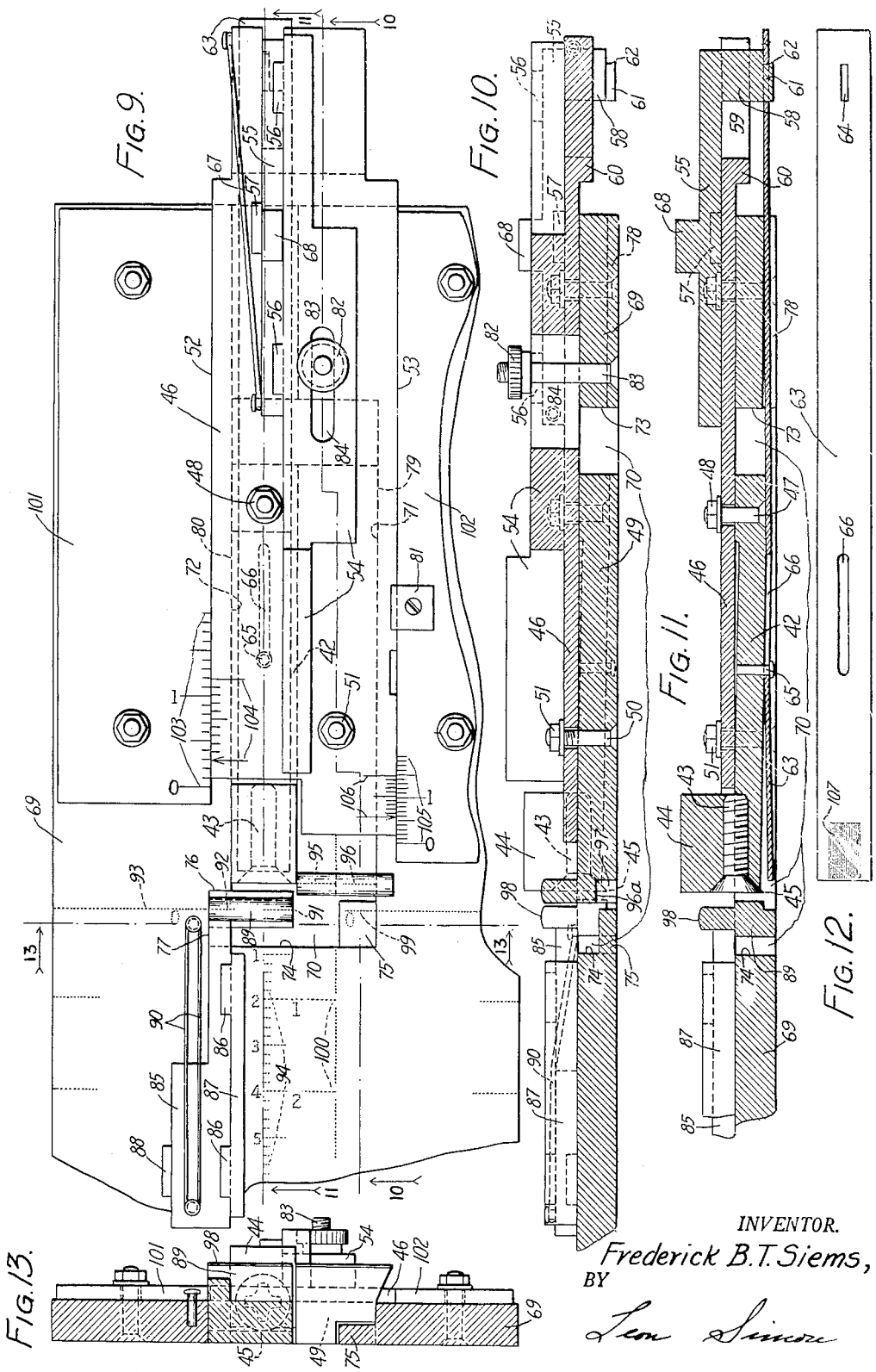

United States Patent Office 2,744,330
Patented May 8, 1956

2,744,330

MARKING INSTRUMENT

Frederick B. T. Siems, Baltimore, Md.

Application April 14, 1952, Serial No. 282,109

16 Claims. (Cl. 33—34)

The present invention relates to a marking instrument. More particularly the present invention relates to an instrument for the use in drafting and analogous fields which includes means for measuring and/or laying off distances and for making suitable marks on a drafting surface indicative of these distances.

Although it has been suggested previously to provide various instruments including a scale and marking element, the marking element has been limited to a steel pointer. Markers of this type are likely to be damaged and the marking point displaced relative to the scale. Further, the use of a point as a marking element, has proven unsatisfactory in some instances due to surface damage and/or the difficulty of distinguishing fine pin pricks in certain surfaces.

It is a general object of the present invention therefore to provide a marking instrument including an especially durable marking member or means capable of producing short, fine linear impressions on a drafting surface which may be readily removed if desired.

A second object of the present invention is to provide a marking instrument including in combination a scale and a marking means for impressing a mark in the form of a short, fine line indicative of scale distances on a suitable surface.

A third object of the present invention is to provide a marking instrument of the character described, capable of use in place of dividers or the like to take off measurements from a master scale or other source and lay off these measurements on a drafting surface.

A fourth object of the present invention is to provide a marking means associated with a scale and capable of forming a short, fine line together with a means for supplying ink in limited quantity to the marking portion of the marking means.

A fifth object of the present invention is to provide a novel scale arrangement including means for the accurate measurement and lay off of extremely small distances and provided with a plurality of reference lines facilitating such operation.

A sixth object of the present invention is to provide novel ink feeding means for a marking member.

Other objects and advantages of the present invention will become apparent from the subsequent description and figures of the drawing wherein:

Figure 1 is a plan view of one form of the present invention,

Figure 2 is a vertical section taken generally along the line 2—2 of Figure 1,

Figure 3 is a transverse vertical section taken generally along the line 3—3 of Figure 1, Figure 4 is a plan view of a part of the instrument shown in Figure 1 and showing the elements in operating or measuring position, Figure 5 is an enlarged perspective view, partially broken away, of a portion of the instrument of Figure 1, Figure 6 is a detail perspective view of a portion of the instrument taken from the bottom thereof and showing certain of the reference lines in detail, Figure 7 is a bottom plan view of a second form of the instrument of the present invention, partially broken away, Figure 8 is a side elevation partially cut away of the modification of Figure 7, Figure 9 is an enlarged top-plan view of a portion of the instrument of Figure 7, Figure 10 is a section taken generally along the line 10—10 of Figure 9, Figure 11 is a section taken generally along the line 11—11 of Figure 9, Figure 12 is a detail plan view of the ink retainer strip forming the part of the second form of the present invention, Figure 13 is a section taken generally along the line 13—13 of Figure 9, Figure 14 is an enlarged perspective view of the sliding assembly forming a part of the device of Figure 9, Figure 15 is a perspective view of the slider member, Figure 16 is an enlarged perspective view of a second slider member forming a part of the instrument.

Referring to the figures of the drawing, and particularly Figure 1 thereof, the arm 1, secured endwise as a cantilever to the supporting block 2, a sharp edged flathead screw 3, inserted home in the free or unsupported, upwardly enlarged end-portion 4 of the arm substantially longitudinally thereof, and the rim-segment 5 of the head of the screw 3 left exposed below the under surface of the arm to form a marking edge, constitute the marking device, of which there are two in this form of instrument. The arm 1 is capable of being flexed vertically by pressing the enlarged end-portion 4 manually to bring the marking edge 5 from its normal position above the plane of the underside of the supporting block 2 to a marking position in said plane.

The thin, angular-shaped strip or ink retainer 6 preferably of thin metal or plastic is attached to the rectangular piece 7 (Fig. 5), which in turn is secured to the supporting-block projecting part 8, so that there will be a surface to surface or wiping contact between the head of the screw along its flat surface immediately adjacent the marking edge 5 and the strip. The strip 6 will project slightly below the edge 5 when in its normal position. A minute supply of stamping ink applied from a fine penpoint to fill the aperture 9 (Fig. 5) will travel in the inside surface groove 10 to the contacted surface. There is thereby provided a capillary reservoir 10a for ink. Downward movement of the marker from its normal position and return thereto will prime the marking edge 5 for stamping. In again depressing the marker to bring the primed marking edge in contact with a drafting surface for a marking, ink held in the reservoir 10a above the normally projecting end of the retainer 6 descends with the marker and is conveyed to the very end of the retainer strip 6. The ink removed from the marking edge in the marking operation is replenished with ink from the end of the retainer during the return of the marker to the normal position. With the arrangement just described only a limited amount of ink is retained on the edge 5 after it passes below the end of the retainer.

Forming the resting surface of the instrument are the undersides of the supporting block 2, of the projecting parts 8, of the elongated, rectangular, transparent plate or scale body 11, and of the parallel scales 12, adjustably attached to the scale body 11. Both of the parallel scales 12 are provided with graduated, beveled edges 13 slightly spaced inwardly from a vertical plane defined by the longitudinal axis of each of the marker arms 1. The resting surface is in coincidence with a drafting surface when the instrument is applied thereto.

The elongated, rectangular blade 14, an integral part of the supporting block 2 and parallel with the marking arms 1, overlies a central portion of the scale body 11 and is in slidable contact therewith and with the guide rails 15, which may be integral parts of the scale body 11 or riveted thereto, parallel with the scales 12 and coplanar with the blade 14. The sides of the overlying part of the blade 14 conform to walls 17—17, rising from recessed portions 18 and 19 in the supporting block 2. Said recessed portions are coplanar with the scale body 11. The edges 20 of the recessed portions 18 and 19 are in alignment with each other, normal to the blade 14 and spaced outwardly from the marking edges 5. The plate 21 bridges the projecting rail parts 22, forming an integral part thereof, and overlies the blade 14 in slidable contact therewith. The projecting rail parts 22 overlie the recessed portions 18 and 19 respectively and are in slidable contact therewith and with the walls 17 of the blade 14.

The blade 14 is held laterally by the rails 15 and the projecting rail parts 22 which extend from the rails 15 and are reinforced by the plate 21. The blade 14 is held vertically by the plate 21 and the clamp nut 23. The blade 14 is therefore capable of only longitudinal movement, thereby increasing or decreasing at will the distance between a position on the supporting block 2 and a position on the scale body 11. The open-end slot 24 of the blade 14 houses the clamp bolt 23a projecting from the scale body 11 and permits the removal of supporting block 2 and associated parts from the scale body 11 and its associated parts.

The rectangular, transparent part 25 of the scale body 11 projecting from its inner edge 26 and spaced from its longitudinal edge 27, is adapted to be received in the opening 28 (Fig. 5) of the recessed portion 18. The scale 29, inscribed on the underside of the scale body 11 along its edge 27, has the theoretical position of its zero graduation beyond the edge 26 of the scale body 11; but the line 30, transversely in alignment with the said theoretical position, is inscribed on the underside of the projection 25 (see Fig. 4).

The graduations of scale 29 are lines perpendicular to edge 27, and similar graduations are provided along the other longitudinal edge of the scale body 11.

The reference line 31, is inscribed on the underside of the transparent, recessed portion 18, is at—and perpendicular to—the edge 32 of said portion; said edge being in alignment with edge 27 of scale body 11 and parallel with the vertical plane defined by the longitudinal axis of marker arm 1. A line 35, similar to line 31, is inscribed on the underside of the transparent, recessed portion 19 at the edge 32a in parallelism with edge 32.

The magnifier 33, having a cylindrical lens surface and forming an integral part of recessed portion 18, is positioned to magnify reference line 31 crosswise. A part of the magnifier 33 projects over the opening 28 and is formed with a horizontal under-surface. The reference line 34 is inscribed on the said under-surface at its intersection with a vertical plane defined by reference line 31 and line 35, and it also is magnified crosswise.

The marking edge 5 is that segment of the screw-head rim that happens to constitute its lowest part, the position of the lowest part being adjustable longitudinally of the arm 1 by rotating the screw 3. In this manner the marking edge 5 may be brought in correct position which is the alignment of the marking position of said edge with reference line 31 and line 35. Normally, the marking edge is in correct position when the screw is driven home; and if adjustment is required an appropriate turn of the screw is made, adding shims or slightly reaming the hole receiving the screw to effect a home position of the screw. The piece 7 holding the ink retainer is temporarily removed while replacing or adjusting screw 3.

Lugs 36 projecting from the back of scale 12 and overlying the scale body 11 from its edge 27 (Fig. 1) inwardly, a clamp bolt 37 rising vertically from scale body 11 through an opening 37a in each of said lugs, larger than bolt 37, and the clamp nut 38, provide the means for attaching and securing scale 12 to scale body 11.

The enlarged openings 37a in lugs 36 allow some movement of the bolts 37 therein and adjustment of a scale 12 longitudinally to effect its correct position with respect to the scale body 11; the correct position being attained when any graduations of scale 12 appears in alignment with a corresponding graduation on scale 29—including the alignment of the zero graduation of scale 12 with the line 30 which is the off-set zero graduation of scale 29.

Non-corresponding graduations on scale 29 appearing on the drawing are provided for use in connection with other attachable scales 12 that have a different unit of graduation. The graduations on scale 29 are left unnumbered; they take the numbers of corresponding graduations appearing on scale 12.

The index line 39, inscribed on the underside of transparent plate 21, cooperates with scale 40 of fractional parts of the unit of graduation of scale 12. The index line 39 also cooperates with other scales of fractional parts of said unit but of different denominators. The index line 41 cooperates with scales of fractional parts of a different unit of graduation of other attachable scales which may be utilized in place of scales 12. All said scales of fractional parts are inscribed on the upper surface of blade 14.

By construction, coincidence of the index line 39 with the zero graduation of scale 40 is effected when a line 30 (off-set zero graduation of scale 29) is brought—by virtue of the previously described sliding arrangement—in alignment with reference line 31 and vertically under reference line 34; by aforesaid adjustments, the marking position of the marking edge 5 and the zero graduation of scale 12 are brought in the said alignment at the same time. Accordingly, in any position of one slidable part with respect to the other the fractional distance indicated by index line 39 on scale 40, is the distance obtaining between the marking position of the marking edge 5 and the zero graduation of scale 12, and it is also the distance obtaining between line 30 (off-set zero graduation of scale 29) and a vertical plane defined by reference line 34. The eye of a draftsman is brought in said vertical plane when reference line 34 appears in alignment with reference line 31; hence, a point on a drafting surface in range with reference line 34 when the latter appears in alignment with reference line 31 will be at the said fractional distance from the off-set zero graduation line 30. The said apparent aligning is aided by magnifier 33.

A distance, composed of one or more units of scale 12 and a fractional part of said unit indicated on scale 40, will obtain between the marking position of the marking edge and the graduation on scale 12 denoting or expressing that part of the distance, composed of one or more units, from the zero graduation of scale 12; the same distance will also obtain between reference line 31 and the graduation on scale 29 corresponding to the said graduation on scale 12.

The steps taken in laying down a given distance with the device of Figs. 1 to 6 inclusive, say 4⅞ units of linear measure of scale 12, from a given point and along a given direction on a drafting surface are as follows: (a) the two slidable parts of the instrument are shifted with respect to each other to effect a reading of the fractional part ⅞ on scale 40 by the index line 39, and the said parts are held in resulting relative position by clamping them together by means of the clamp nut 23, (b) the instrument is applied to the drafting surface and maneuvered to bring graduation indicated at 12a on scale 12 in contact and in alignment with the said given point and at the same time to bring edge 13 in the said given direction, and (c) the upwardly enlarged part 4 of the end of the marker arm 1 is manually pressed down to effect contact of the marking edge with the drafting surface and thereby produce a mark in the form of a short, fine, straight line outside of—adjacent to— and normal to—the line of the said given direction. The distance between the plotted mark and given point on the drafting surface corresponds to the given distance; also, the latter obtains between reference mark 31 and the graduation 12b on scale 29.

In laying down only the fractional part, for example, ⅞ of the unit of measure of scale 12, the steps given in the preceding paragraph are taken except that in step (b) the zero graduation of scale 12 is brought in alignment with the given point; contact with the given point may not be possible, as will be explained later. There is no zero graduation for scale 29 to cooperate with reference line 31, however, the fractional distance ⅞, as in the case of all distances less than the unit of measure of scale 12, obtains between line 30 (off-set zero graduation of scale 29) and the vertical plane defined by reference line 34, in which said plane the eye of an observer is brought by the apparent alignment of reference line 34 with reference line 31 as heretofore explained.

The steps taken in measuring a distance less than one unit of measure of scale 12 regardless of how close the two given points defining the distance may be with respect to one another on a plane surface, are as follows: (a) the instrument is applied to said surface and maneuvered to bring line 30 (off-set zero graduation of scale 29) in coincidence with an appropriate one of said points while the line between the latter approximately parallels edges 27 or 32, (b) the scale body together with its appendages are held in the position defined by step (a), and the supporting block 2 together with its appendages are shifted slidably to bring reference line 34 vertically over the other of said points, the vertical viewing of reference line 34 being effected by its apparent alignment with reference line 31 aided by the magnifier 33. The first said point and off-set zero line 30 in coincidence therewith would be viewed through magnifier 33, when the second said point happens to lie under the transparent projection 25. Upon completion of step (b), the required measurement of the distance will be indicated by the index line 39 on scale 40; and the resulting position of the scale body and its appendages with respect to the supporting block and its appendages may be held by clamp nut 23, permitting transfer of the distance read on scale 40 to a drafting surface by following the procedure of laying off a given distance from a given point.

The procedure taken in measuring a distance greater than the unit of measure of scale 12 and between two given points on a plane surface, is as follows: the instrument is applied to said surface and maneuvered in position to bring reference line 31 and an appropriate graduation on scale 29 having a corresponding graduation on scale 12 in coincidence respectively with the two said points; shifting the scale body 11 and its appendages with respect to the supporting block 2 and its appendages as may be required to effect the said dual coincidence. The required measurement of the distance will be indicated by the number of units appearing on said corresponding graduation of scale 12 plus the fractional part read on scale 40 by index line 39. Clamping the instrument will permit the transfer of the distance to a drafting surface by following the procedure taken in laying down a given distance. If the object in view is merely a transfer of the distance, no note of the fractional reading on scale 40 need be made.

The lower end of the zero graduation of scale 12, being slightly spaced from the marking position of the marking edge when the latter is in alignment with the said zero graduation and being at the very end of edge 13, is liable to be marred or slightly cut away. The remainder of the graduation extends across the beveled face of scale 12, a flared end portion of said face flanking the graduation. Room for the end portion is made by an appropriate tilting position of the screw 3. If the lower end of the zero graduation is not well defined, it cannot be brought accurately in contact with a given position on a drafting surface, however, alignment of the remainder of the graduation with the said position may be made. An additional graduation, spaced a fractional unit from the zero graduation on scale 12, such as graduation 12c, may be used instead of zero graduation for marking off distances involving only fractional parts of the unit of measure of scale 12 but equal to or greater than said fractional unit. The given distance is set between the marking position of the marking edge and the said additional graduation by causing a reading on scale 40 to equal the given distance minus the fractional unit.

Two sets of a series of attachable scales 12 corresponding respectively with the series of scales of fractional parts are provided. Scale bodies 11 differing as to the unit of graduation of scale 29 and appropriate attachable scales 12 for said scale bodies, may also be provided for use with the same supporting block and its appendages; however, a reversal of the described and illustrated positions of the index lines 39 and 41 with respect to scale 40 and remainder of the series would obtain. In other words, the said series of scales would be carried on plate 21 and the indexes on blade 14, the differing series of scales of fractional parts on the several scale bodies being appropriately positioned to cooperate in each case with indexes 39 and/or 41.

It is desirable to use a beveled edge scale 12 in a position in which the graduated, beveled side faces in a direction away from a draftsman rather than towards him, for better light and greater ease in aligning a graduation with a given position on a drafting surface. If the marking device associated with one of the scales 12 is to the left of said scale in the said desired position, the second marking device will be to the right of the other of the scales when the latter is brought in the said desired position. In marking off distances to the left and right of a given point, use would be made respectively of the first said scale and its marker on the one hand and of the second said scale and its marker on the other. Hence the reason for having two marking devices on this form of instrument.

It will be understood that it is within the broad scope of the present invention to utilize the marking member 5 and arm 1 with a simpler type of scale wherein, for example, the scale body 11 is an integral part of the marker arm support 2. The various fractional scales may also be omitted and the scale 12 provided with fractional markings along its length.

The embodiment of the invention illustrated in Figs. 7 to 15 inclusive of the accompanying drawings, is especially suitable for precision chart-drafting. The marking device or member is similar to that heretofore described except that the stamping ink is picked up from a plastic or thin metal strip attached to a slider. The marking device forms part of an assembly slidably movable in an opening in the scale body and slidably supported by the latter, thereby precluding the possibility of any sensible longitudinal displacement of the marking device relative to the scale body due to a horizontal deflection of the instrument—a consideration upon which precision of operation depends.

Referring to Figs. 7 to 15, and particularly Fig. 14, the arm 42, rectangular in cross section; the sharp edged flathead screw 43, inserted home longitudinally of the arm 42 in the upwardly enlarged end portion 44 thereof; and the rim portion of the head of said screw exposed below said arm to form the marking edge 45, constitute the marking device.

The said marking device; the elongated, rectangular plate 46, to the underside of which the marker arm 42 is rigidly attached endwise by means of the bolt 47 and nut 48; the transparent bar 49, rectangular in cross section and of greater depth than arm 42, and attached centrally to the underside of said plate by means of the bolt 50 and nut 51 and alongside the said arm, and parallel with the longitudinal sides 52 and 53 of said plate; and the reinforcing member 54, superimposed on plate 46 and forming an integral part thereof, constitute the slide assembly.

The slider 55 (Fig. 15) is guided slidably on the surface of plate 46 by bosses 56, 56 on one side of the member 54 and along said side by boss 57 on said plate. The downwardly-enlarged end-portion 58 of said slider projects through the open-end slot 59 in the downwardly-enlarged end 60 of plate 46, and carries the narrow, elongated terminal element 61 having a projection 62 at its outer end.

The elongated ink-container strip 63 of thin sheet metal or plastic is attached to the slider 55 by means of the terminal element 61, which is inserted in the strip opening 64 and adapted to be held therein. The strip 63 is slidably held along the underside of marker arm 42 by the headed pin 65 engaged in the narrow slot 66 cut through a central section of said strip. The strip 63 is maintained in a rearward position wholly inside of the marking edge 45 (Figs. 9 and 11) by a pulling action transmitted to said strip by the rubber band 67, stretched between the inner end of said slider and the outer end of the slide assembly, and by the arresting action of pin 65 against said strip at one end of slot 66. An inner end portion of said strip may be brought forward and under the marking edge 45 (Fig. 7) by moving slider 55 forward at its upward extension 68 against further tension of said rubber band. Upon release of the said forward movement pressure, the said strip will return automatically to the first position.

The transparent scale body 69, a rectangular, elongated plate of uniform depth corresponding to that of bar 49, extends substantially the length of the instrument. The rectangular, elongated opening 70 in said body longitudinally thereof and near one end thereof, is bounded by its longitudinal sides 71 and 72 and by its transverse sides 73 and 74. The lower part of a corner of the inner end of the opening 70 is contained by the rectangular plate 75 integral with the scale body 69. The other corner of the inner part of said opening is recessed laterally forming additional sides 76, 77, and a continuation of side 74. A slot 78, recessed on the underside of said scale body and extending from the opening 70 to the said end of said body, receives part of the ink-container strip 63 above the plane of said underside.

The slide assembly is received in the opening 70, the outer sides 79 and 80 of the bar 49 and arm 42 respectively, slidably contact sides 71 and 72 of the opening 70 respectively, and the undersides of plate 46 on either side of said bar and arm and rearward thereof rest slidably on the scale body. Uplifting of the slide assembly is prevented by plate 81 attached to said body and by the clamp nut 82 on clamp bolt 83 projecting from said body through the slot 84 formed in plate 46 and reinforcing member 54.

The slider 85 (Figs. 9 and 16) is guided slidably on the surface of scale body 69 by bosses 86, 86 on rail 87 and along said rail by boss 88 on the body 69, said rail forming an integral part of said body and extending longitudinally thereof. The transparent, enlarged end-portion 89 of said slider, adapted to be received in the opening 70 between side 74 and marking edge 45 and to slidably contact the recessed side 77, is held against side 76 by the rubber band 90 stretched between appropriate points on said slider and scale body respectively. In this position of the slider, the reference lines 91 and 92 inscribed on the under surface of end portion 89 are in alignment transversely with the offset zero graduation 93 of scale 94 which is in alignment with the marking arm 42 and is inscribed on the underside of scale body 69. In the said position of the slider, reference line 91 is the zero graduation of scale 94.

Reference line 95 is inscribed on the underside of bar 49, and reference line 96 is inscribed on the horizontal surface 96a bounding a rectangular recession 97 from said underside (Fig. 10), said recession being adapted to receive a part of plate 75. The two said reference lines 95 and 96 and the marking edge 45 brought in marking position which is in the plane of the underside of the bar 49 or scale body 69, lie in a vertical plane normal to the longitudinal axes of said bar and arm 42.

The top of the transparent end-portion 89 of the slider 85 is a convex cylindrically curved surface forming lens 98 which magnifies reference lines 91 and 92 crosswise. Reference lines 95 and 96 are similarly magnified.

Line 99 inscribed on the underside of plate 75 and continued on the underside of scale body 69 is the off-set zero graduation for scale 100 which is in alignment with a longitudinal direction of the bar 49. Lines 93 and 99, off-set zero graduations of scales 94 and 100 respectively are in alignment with one another in a direction normal to the said scales.

Scale members 101 and 102, rectangular plates preferably white appearing, are attached to the surface of scale body 69 and in slidable contact respectively with sides 52 and 53 of plate 46 preferably white appearing also; said scale members are co-planar with plate 46.

The scale 103 and the vernier 104 cooperating therewith are inscribed on the surfaces of member 101 and plate 46 respectively. The graduations on said scale are subdivisions of the unit of graduation of scale 100. Scale 94 is composed of graduations corresponding to those of scale 100 and of subdivisions of the said unit of graduation.

The scale 105 and the vernier 106 cooperating therewith are inscribed on the surfaces of member 102 and plate 46 respectively. The graduations on said scale are subdivisions of one-half the unit of graduation of scale 100. Graduations of said half unit are numbered along scale 94.

By appropriate length of opening 70, the slide assembly with respect to the scale body 69 is slidable longitudinally for a distance equivalent to the unit of graduation of scale 100. When said assembly is slid to the limit of travel toward scales 94 and 100, the following takes place (Fig. 7): (a) The slider end 89, actuated by the slide assembly, is brought to the inner end of said opening at its side 74; (b) tension in the rubber band 90 is increased; (c) the marking edge 45 in marking position replaces reference line 91 as the zero position of scale 94, and said reference line bcomes a subdivision of said scale; (d) a part of plate 75 is received in the recession 97 and reference line 96 is brought vertically above off-set zero graduation 99; (e) reference line 95 becomes the zero graduation of scale 100; and (f) the indexes of verniers 104 and 106 are brought in alignment with the zero graduations of scales 103 and 105 respectively. Accordingly, in any other slidable position of said assembly (Fig. 9), the distance indicated on scales 103 or 105, obtains between off-set zero graduation 99 and a vertical plane defined by reference line 96, the eye of an observer being brought in said plane when reference lines 95 and 96 are viewed to appear in alignment; said indicated distance further obtains between the marking position of the marking edge 45 and reference line 91 when the latter by position is in effect the zero graduation of scale 94. A distance composed of one or more units of measure of scale 100 plus a distance indicated on scale 103 obtains between the appropriate graduation on scale 100 and reference line 95, and between the corresponding graduation on scale 94 and the marking position of the marking edge 45.

To lay off, from a point on a drafting surface, a distance less than that obtaining between reference line 91 and marking edge 45 in abutting position with slider end 89, the following steps are taken: (a) reference line 91 in position as the zero graduation of scale 94 is brought in coincidence with said point, and the scale body 69 is held to the drafting surface during the remaining steps; (b) the said distance is set on scales 103 or 105 by a forward shifting of the slide assembly and is secured by the clamp nut 82, the slider end 89 thereby being moved displacing reference line 91 from its said position; (c) a mark is produced on the drafting surface by the marking device. The marked-off distance may be verified by shifting the instrument transversely and bringing the off-set zero graduation 99 in coincidence with the said point, the said mark should then appear in range with reference line 96 when the latter is viewed to appear in alignment with reference line 95.

The resting surface of the instrument applied to a drafting surface comprise the underside of the scale body 69, the underside of bar 49, the underside of slider end 89 and the underside of plate 75. The marking edge 45 assumes a normal position above said drafting surface permitting an end portion of the ink-container strip 63 to be brought between said marking edge and drafting surface. The upper surface of said strip end is scored longitudinally with a plurality of fine, closely spaced grooves 107 capable of retaining minute streams of stamping ink.

The steps in the marking procedure are as follows: (a) the slider 55 is moved forward at extension 68 to bring the ink filled grooves 107 of strip 63 under the marking edge 45; (b) marker arm 42 is pressed down at end 44 to bring marking edge 45 in contact with said grooves thereby priming said edge with a light supply of ink; (c) said pressing—and moving—forces are withdrawn to allow said edge and strip to return automatically to their normal positions; and (d) marker arm is pressed down at end 44 to bring said marking edge in contact with a drafting surface, thereby producing a faint but distinctive, fine, short, inked line on said surface.

The extension plate 69a carries scales 100a and 94b which are continuations of scales 100 and 94 of scale body 69 when the extension plate 69a, is joined thereto. The plates 69 and 69a are of similar cross-section and when joined together by a locking and wedge arrangement will be co-planar. The locking and wedge arrangement includes the fingers 108 and 109 projecting beyond the edge 110 of extension plate 69a and adapted to cooperate with the projecting members 111 and 112 and the projecting members 113 and 114 respectively. The members 111, 112, 113 and 114 extend upwardly from the upper surface of the scale body 69. In joining the extension plate 69a to the scale body 69, the two members are brought together initially in transverse off-set relation so that the finger 108 is approximately in alignment with the central axis of body 69 and will be received between the members 113 and 114. The edge 110 is then brought into abutting relation to the edge 117 of the scale body 69. Transverse movement (in an upward direction as shown in Fig. 7) of the plate 69a will cause the feet 116—116 to be received between the members 111 and 113 as well as between the members 112 and 114. The members 111 and 112 will also be received within the openings 115—115. The various parts are so arranged and formed that when the plate 69a is in alignment with the body 69, the various parts will be firmly wedged and locked together.

It will be obvious to those skilled in the art that various changes may be made without departing from the spirit of the invention and therefore the invention is not limited to what is shown in the drawings and described in the specification but only as indicated in the appended claims.

What is claimed is:

1. A marking instrument for producing short, fine linear impressions on a drafting surface comprising a marking means having a marking portion positioned to contact said drafting surface in marking position, said marking means being provided with at least one substantially planar surface extending from said marking portion, movable means for normally supporting said marking means in spaced relation to said drafting surface, said movable means being arranged to permit movement of said marking means to said marking position on said surface, and stationary ink-feeding means positioned adjacent said planar surface of said marking means and arranged to form with said planar surface a capillary reservoir for marking ink, said ink-feeding means having an end extending beyond said marking portion toward said drafting surface when said marking means is in normal position whereby said portion is supplied with a limited quantity of ink upon passing said end.

2. A marking instrument for producing fine marks on a drafting surface comprising a marking means having a fine marking edge positioned to contact said drafting surface in marking position, movable means for normally supporting said marking means in spaced relation to said drafting surface, said movable means being arranged to permit movement of said marking means to said marking position on said surface, and inking means comprising a strip having ink-retaining grooves in one surface thereof, said strip being mounted for sliding movement to one position between said marking edge and said drafting surface to thereby supply ink to said marking edge, and movable to a second position to permit unobstructed movement of said marking edge to said drafting surface.

3. A marking scale comprising, a flat supporting body, a scale member on said body, a marking means support movably mounted adjacent one end of said body in general alignment with said scale member and having a base portion with a lower face in co-planar relation to the lower face of said supporting body, blade means extending from said marking means support and having a lower face in slidable face to face relation to an upper face of said body, a plurality of lateral guide means adjacent the said end of said body and extending upwardly therefrom and beyond said end in spaced relation to form a guide channel for said blade means, a bridge member extending across the portion of said lateral guide means beyond said end to limit upper vertical movement of said blade member, and cooperating index and scale means to indicate displacement of said marking means support relative to said body and first scale member.

4. A marking ruler or scale comprising a first portion and a second portion, two parallel scales on said first portion, corresponding graduations of said scales being respectively in alignment transversely of said first portion, guide means for slidably moving said portions, one with respect to the other, in a direction paralleling said scales, marking means movably supported on the second portion, and including an impressing element on lower extremity of said marking means, said impressing element being movable to an impressing position on a drafting surface to which the scale is applied, the impressing position of said element being in substantial alignment with a first of said scales, a reference mark on said second portion, said mark being in alignment with the second of said scales and transversely in alignment with said impressing position of said element, and a third scale and an index cooperating therewith respectively on the said two portions, said index indicating a reading on said scale corresponding to the distance between the zero graduations of said first two scales on the one hand and said reference mark and said impressing position of said element respectively on the other.

5. A marking rule or scale comprising a scale body and a scale thereon, an opening formed in said body in alignment with said scale and occupying a position corresponding to the zero graduation of said scale, a slide assembly movably supported by said scale body, a marker supported by said assembly and received in said opening, an impressing element on lower extremity of said marker movable to and from a drafting surface to which the marking rule or scale is applied for receiving an impression by said element, means for slidably guiding said assembly to retain the impressing position of said element in alignment with said scale, a slider movably supported on said scale body having a reference mark on an enlarged end portion thereof, said end portion being positioned to be received in said opening, means for slidably guiding said slider to retain said mark in alignment with said scale, tension means and a stop to automatically move said slider to a normal position and hold said slider in said position in which the said reference mark becomes the zero graduation of said scale, means for moving slider from said normal position when actuated by said slide assembly manually pressed against said slider, and a scale an an index respectively on said scale body and said slide assembly, the index indicating a reading on said scale corresponding to the distance obtaining between the impressing position of said element and the position of the zero graduation of the first said scale.

6. A measuring rule or scale comprising in combination two transparent plates, the undersides of which are co-planar, a scale, the graduations except the zero graduation of which are inscribed on the undersurface of a first one of said plates, an opening formed in said plate corresponding to the zero end of said scale, a transversely off-set zero graduation of said scale inscribed in the undersurface of a part of said plate adjacent to opening, guide means for slidably moving said two plates, one with respect to the other, in a direction paralleling said scale, a reference line inscribed on the underside of an end portion of the second of said plates, said reference line being in transverse alignment with said scale as a graduation thereof, a second reference line inscribed on a horizontal surface of a recession extending inwardly in said end portion of said second plate and upwardly from the undersurface of said end portion, both of said reference lines lying in a vertical plane and appearing continuous when viewed vertically, said second reference line opposing said off-set zero graduation, and a second scale and index respectively on said two plates, said index indicating a reading on said second scale corresponding to the distance obtaining between the said off-set zero graduation and a vertical plane defined by the second said reference line, a part of the said first plate adjacent to said opening being adapted to be slidably received in said recession while said end portion of said second plate is received in said opening, so as to bring the first said reference line in the position corresponding to the zero of the scale and the second of said reference lines vertically above and vertically in alignment with the off-set zero graduation.

7. A marking instrument designed to be applied to a drafting surface and coordinated with a given position thereon for stamping on said surface a short, fine linear mark precisely indicative of the end of a given distance from said position comprising a supporting body including a means for correlating and positioning said body and instrument relative to said drafting surface and said position, a marking means supported by said body for movement to and from said drafting surface, biasing means normally urging said marking means away from said drafting surface, said marking means including a marking edge portion fixedly supported by said marking means for movement therewith whereby said edge is applied to said drafting surface upon application of a force in opposition to said biasing means, and an ink surface-held reservoir supported by said body in the path of movement of the marking edge with which said marking edge is brought into contact during movement thereof.

8. The marking instrument of claim 7 wherein the marking means is supported by the free end of a flexible arm, which is secured at its other end to said supporting body, said arm constituting said biasing means.

9. The marking instrument of claim 7 wherein the marking edge is arcuate.

10. The marking instrument of claim 7 wherein the means for correlating is a scale carried by said supporting body and the marking edge when applied to said drafting surface is in alignment with said scale.

11. The marking instrument of claim 10 wherein said scale is out of alignment with said marking edge.

12. A marking ruler or scale comprising a first portion and a second portion, two parallel scales on said first portion, corresponding graduations of said scales being respectively in alignment transversely of said first portion, guide means for slidably moving said portions, one with respect to the other, in a direction paralleling said scales, marking means movably supported on the second portion, and including an impressing element on lower extremity of said marking means, said impressing element being movable to an impressing position on a drafing surface to which the scale is applied, the impressing position of said element being in substantial alignment with a first of said scales and a reference mark on said second portion, said mark being in alignment with the second of said scales and transversely in alignment with said impressing position of said element.

13. A marking instrument designed to be applied to a drafting surface and coordinated with a given position thereon for stamping on said surface a short, fine linear mark precisely indicative of the end of a given distance from said position comprising a supporting body including means for correlating and positioning said body and instrument relative to said drafting surface and said position, and a marking means including an arm supported at one of its ends by said body for arcuate movement by its free second end to said second end may be manually moved from retracted position in spaced relation to said drafting surface to marking position adjacent to said surface, means for retaining said arm in retracted position, said marking means including an arcuate marking edge portion fixedly supported by the second end of said arm, whereby upon manual movement of said arm a limited segment only of said arcuate edge is tangentially applied to said drafting surface.

14. The marking instrument of claim 13 wherein the arm is a flexible arm normally biased into retracted position at its free end.

15. The marking instrument of claim 13 wherein the arcuate marking edge is formed by the intersection of a generally conical surface with a surface extending transversely thereto.

16. The marking instrument of claim 13 wherein the means for correlating is a scale carried by said supporting body and the position of the arcuate edge when applied to said drafting surface is in alignment with said scale with the longitudinal axis of said edge transverse to axis of said scale.

References Cited in the file of this patent

UNITED STATES PATENTS

| 837,869 | Myers | Dec. 4, 1906 |
| 1,150,860 | Graham | Aug. 24, 1915 |
| 1,646,206 | Martin | Oct. 18, 1927 |
| 2,542,537 | Klemm | Feb. 20, 1951 |
| 2,583,679 | Boston | Jan. 29, 1952 |

FOREIGN PATENTS

| 126,225 | Switzerland | June 1, 1928 |
| 460,914 | Germany | June 9, 1928 |